UNITED STATES PATENT OFFICE.

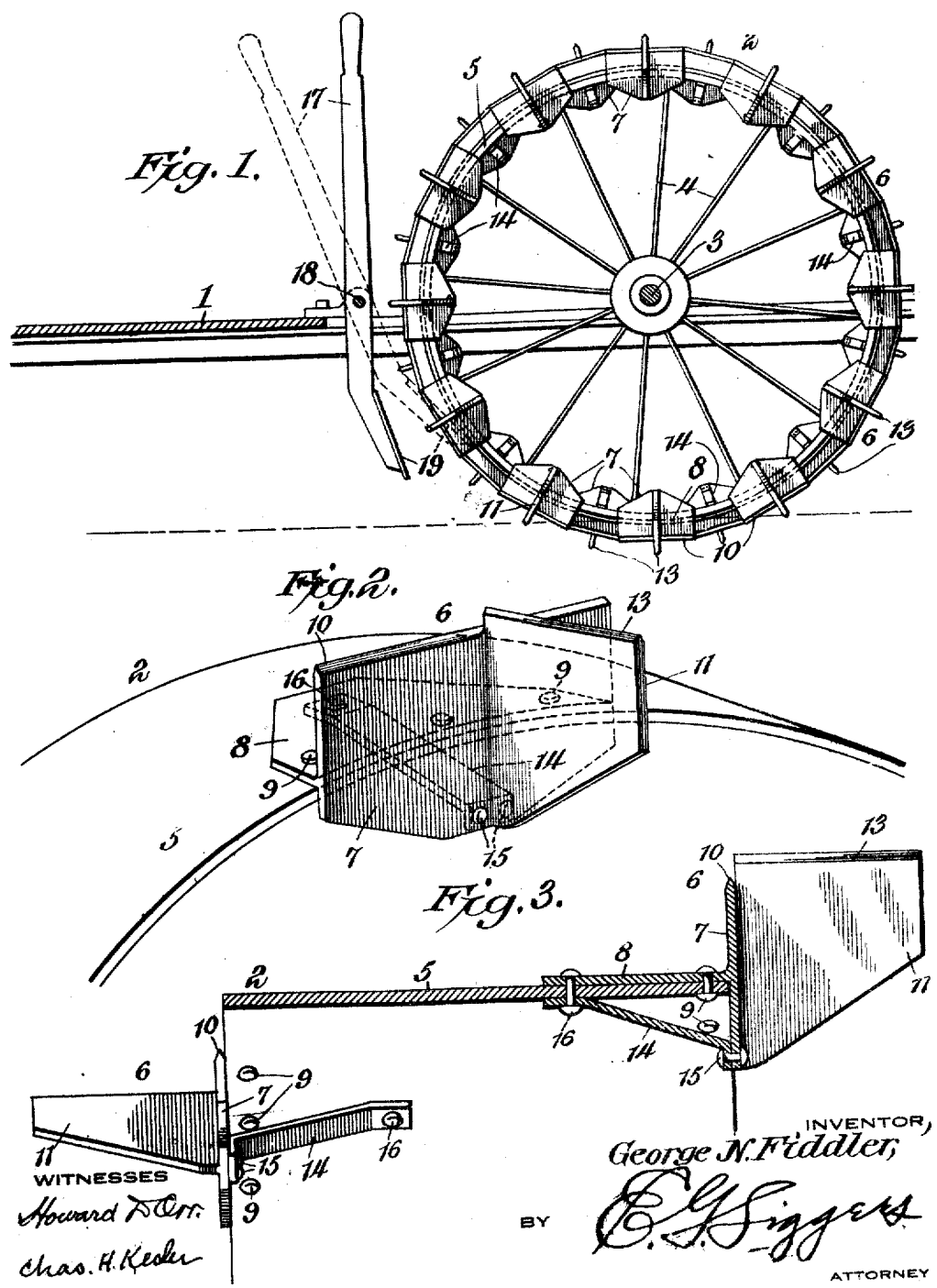

GEORGE N. FIDDLER, OF POLLOCK, SOUTH DAKOTA.

TRACTION-WHEEL.

1,265,637.

Specification of Letters Patent.

Patented May 7, 1918.

Application filed May 29, 1917. Serial No. 171,678.

*To all whom it may concern:*

Be it known that I, GEORGE N. FIDDLER, a citizen of the United States, residing at Pollock, in the county of Campbell and State of South Dakota, have invented a new and useful Traction-Wheel, of which the following is a specification.

This invention relates to traction wheels for tractors.

An object of the invention is to provide a construction which will grip the ground irrespective of weather or soil conditions and in which the gripping properties do not depend upon the weight of the tractor but are due to the spade-like construction which bites or digs into the soil.

A further object of the invention is to provide a construction which can be maintained free of mud, clay or gumbo, so that the operating expenses of the tractor will be reduced to a minimum by reason of the fact that it will always maintain a good footing and will not slip when pulling a full load.

In the accompanying drawing I have illustrated one embodiment of my invention, in which:

Figure 1 is a side elevation of my improved traction wheel with part of the framework of the tractor shown in section.

Fig. 2 is a detail perspective view on a larger scale with one of the grips attached to the wheel.

Fig. 3 is a transverse sectional view through a rim and one of the grips, showing another grip in elevation.

As herein illustrated, the framework of the tractor is indicated at 1 and is supported by the usual tractor wheels, one of which is shown at 2, said wheels being mounted upon an axle 3 and provided with spokes 4 and a wide rim 5.

Arranged around the periphery or outside of this rim, at each side thereof, are a plurality of grips, the grips at one side of the rim being staggered with relation to the grips at the opposite side, as shown in Fig. 1.

Each of said grips comprises a plate or channel spade 7 arranged in a vertical plane at the edge of the rim and extending inwardly and outwardly therefrom. The inner face of the plate is provided with a securing flange 8 extending over the outside of the rim and attached thereto by means of suitable bolts 9. The flange 8 is preferably formed integral with the plate 7, is arranged at substantially right angles thereto and projects therefrom substantially midway between the inner and outer edges of the plate. The outer edge of each of the plates 7 or channel spades is sharpened, as indicated at 10, so that it will easily bite or dig into the soil. The channel spades or plates are arranged circumferentially around the wheel and prevent skidding, and also serve to mark out the path of the tractor.

Projecting from the outer face of each of the channel spades 7 is an integral traction spade 11 arranged in a plane radial to the wheel and at right angles to the channel spade 7 and substantially midway between the ends thereof. The outer edge of the traction spade 11 is sharpened as at 13 and projects a short distance beyond the outer sharpened edge 10 of the channel spade. The traction spades 11, as the wheel rotates, dig into the soil and provide a firm footing so that the tractor wheels will not slip.

In order to retain the grip securely upon the wheel, a brace 14 is connected at one end 15 to the inner portion of the grip adjacent the inner edge of the traction spade and at its opposite end 16 to the inside of the rim substantially as shown in Fig. 3, being secured by the same fastening bolt or rivet as the flange 8, thereby securely bracing the grip in its position. The grips are arranged at opposite sides of the wheel rim, as shown, with a space of, say, twelve inches between the traction spades.

Great difficulty has heretofore been experienced in preventing mud, clay or gumbo from accumulating upon the rim of the wheel. Such accumulations retard the progress of the machine, it being impossible for the wheels to obtain sufficient traction for easy locomotion. To clean the mud from the rim and to prevent its accumulation between the channel spades, I have provided a lever 17 which is pivoted intermediate its ends at 18 to the framework 1 adjacent the operator and to the rear of each of the traction wheels. The lower arm of the lever is provided with a scraper blade 19 adapted to engage the rim of the wheel between the channel spades 11, as shown in dotted lines in Fig. 1, so that as the wheel rotates, the mud will be scraped from the rim, whereby the wheel at all times will secure a firm footing upon the soil and caused to bite into the ground irrespective of weather conditions or the softness of the soil. The traction and channel spades, however, never need cleaning, as their arrangement is such that the mud very easily drops off the same.

Heretofore manufacturers of tractors have been compelled to depend upon weight in order to obtain the necessary traction. With this invention about one-third of the weight of the machine heretofore considered necessary to insure sufficient traction may be eliminated with a corresponding reduction in operating expenses. When the tractor wheels have a poor purchase on the ground they are liable to slip backwardly when under heavy load and this involves a loss of time and fuel.

As an example of the size and arrangement of the parts, the tractor wheel may be assumed to have a rim fourteen inches wide with the traction spades about twelve inches apart, the channel spades about four inches long peripherally of the rim and four inches apart at their adjacent ends. The traction blades may be about five inches long and project radially from the rim about half of an inch more than the channel blades. These dimensions are, however, not at all obligatory.

While I have shown and described one embodiment of my invention, it is to be understood that I do not desire to be limited to the details of construction herein shown and described, for obvious modifications will be apparent to anyone skilled in the art.

What is claimed is:—

1. In a grip for a traction wheel, a channel spade adapted to be attached to the rim at the edge and to extend longitudinally therewith, a traction spade extending from the outer face of said channel spade at right angles thereto and transversely of the rim, said channel spade and traction spade being formed in one casting and having straight ground engaging edges, the ground engaging edge of the traction spade being extended beyond the ground engaging edge of the channel spade, and means for securing the grip to the rim.

2. In a grip for a traction wheel, a casting comprising a plate forming a channel spade adapted to be arranged longitudinally of the wheel rim and projecting outwardly and inwardly beyond the rim, a flange projecting from one face of said plate intermediate of the outer and inner edges and coextensive with the length of said plate and adapted to be attached to the outer face of the rim of the wheel, and a second plate projecting from the opposite face of the first-mentioned plate at right angles thereto and arranged radially, providing a traction spade adapted to grip the soil.

3. In a grip for traction wheels, a channel spade adapted to be arranged longitudinally of the wheel rim at the outer edge thereof and projecting outwardly and inwardly beyond the same, a flange projecting inwardly from the inner face of said channel spade at a point between the inner and outer edges of the same and providing attaching means for connecting the channel spade to the outer face of the wheel rim, a traction spade arranged at right angles to the channel spade and projecting at its outer edge beyond the outer edge of the channel spade, and separate means for connecting the inner portion of the channel spade to the inner face of the rim.

4. The combination with a traction wheel having a rim, of a channel spade attached to the edge of the rim, projecting outwardly and inwardly therefrom in a longitudinal line, a flange projecting from an intermediate portion of the inner face of said channel spade and adapted to overlap the rim, means for securing said flange to the rim, a traction spade projecting from the outer face of said channel spade at right angles thereto, the outer edges of both spades being sharpened and the outer edge of the traction spade projecting beyond the outer edge of the channel spade, and a brace connecting the inner end of said channel spade to the inside of the rim.

5. In a grip for traction wheels, a channel spade adapted to be arranged longitudinally of the wheel rim at the outer edge thereof, and projecting inwardly and outwardly from said rim, a flange projecting inwardly from said channel spade and arranged lengthwise the same at a point intermediate of the inner and outer edges and providing attaching means for connecting the same to the wheel rim, and a traction spade arranged at right angles to the channel spade and projecting at its outer edge beyond the outer edge of the channel spade, the channel spade, flange and traction spade being formed of one casting and the outer edges of the channel spade and traction spade being sharpened.

In testimony, that I claim the foregoing as my own, I have hereto affixed my signature in the presence of two witnesses.

GEORGE N. ✕ FIDDLER.
his mark

Witnesses:
   Mrs. GEORGE N. FIDDLER,
   WILLIAM DOMBUSH.